(12) United States Patent
Zhang et al.

(10) Patent No.: US 11,321,553 B2
(45) Date of Patent: May 3, 2022

(54) METHOD, DEVICE, APPARATUS AND STORAGE MEDIUM FOR FACIAL MATCHING

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yanan Zhang, Beijing (CN); Hao Wu, Beijing (CN); Xiaoping Zhang, Beijing (CN); Yangli Zheng, Beijing (CN); Xiaobo Xie, Beijing (CN); Xingpan Sun, Beijing (CN); Baolei Guo, Beijing (CN); Lingguo Wang, Beijing (CN); Bin Fan, Beijing (CN); Siqi Yin, Beijing (CN); Hongxuan Sun, Beijing (CN); Yongqiang Jiang, Beijing (CN); Mengxing Xu, Beijing (CN); Cai Zheng, Beijing (CN); Xianfeng Mao, Beijing (CN); Zhenguo Zhou, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 311 days.

(21) Appl. No.: 16/488,704

(22) PCT Filed: Jan. 11, 2019

(86) PCT No.: PCT/CN2019/071350
§ 371 (c)(1),
(2) Date: Aug. 26, 2019

(87) PCT Pub. No.: WO2019/223339
PCT Pub. Date: Nov. 28, 2019

(65) Prior Publication Data
US 2021/0334518 A1 Oct. 28, 2021

(30) Foreign Application Priority Data
May 25, 2018 (CN) .......................... 201810516485.8

(51) Int. Cl.
G06K 9/00 (2006.01)
G06K 9/62 (2022.01)

(52) U.S. Cl.
CPC ..... G06K 9/00288 (2013.01); G06K 9/00281 (2013.01); G06K 9/6201 (2013.01)

(58) Field of Classification Search
CPC ........... G06K 9/00288; G06K 9/00281; G06K 9/6201
See application file for complete search history.

(56) References Cited

U.S. PATENT DOCUMENTS

2005/0084154 A1* 4/2005 Li ........................ G06K 9/4652
382/190
2006/0251339 A1* 11/2006 Gokturk ................... G06K 9/46
382/305

(Continued)

FOREIGN PATENT DOCUMENTS

CN 104850828 A 8/2015
CN 105095829 A 11/2015

(Continued)

Primary Examiner — Md K Talukder
(74) Attorney, Agent, or Firm — Dilworth & Barrese, LLP.; Michael J. Musella, Esq.

(57) ABSTRACT

The present disclosure provides a method, a device, an apparatus and storage medium for facial matching, wherein the method includes: acquiring an image to be matched; conducting matching for the image to be matched based on at least one of an original sample database and an associative sample database; and outputting a final matching result, (Continued)

wherein the original sample database includes an original sample image, and the associative sample database includes an associative sample image which is formed by adding an associative feature to the original sample image. Herein, obtaining the original sample database and the associative sample database comprises: acquiring the original sample image; obtaining the original sample database based on the original sample image; adding the associative feature to the original sample image in the original sample database and generating the associative sample image, to obtain the associative sample database.

17 Claims, 6 Drawing Sheets

(56) References Cited

U.S. PATENT DOCUMENTS

| | | | | |
|---|---|---|---|---|
| 2007/0071290 | A1* | 3/2007 | Shah | G06K 9/00288 382/118 |
| 2010/0054550 | A1* | 3/2010 | Okada | G06K 9/00308 382/118 |
| 2010/0235400 | A1* | 9/2010 | Myers | G06K 9/00288 707/802 |
| 2011/0058743 | A1* | 3/2011 | Myers | G06F 16/5838 382/190 |
| 2013/0259324 | A1* | 10/2013 | Huang | G06K 9/00288 382/118 |
| 2014/0105467 | A1* | 4/2014 | Myers | G06K 9/00275 382/118 |
| 2016/0275518 | A1* | 9/2016 | Bowles | G07F 7/06 |
| 2019/0180128 | A1* | 6/2019 | Han | G06K 9/00617 |

FOREIGN PATENT DOCUMENTS

| | | |
|---|---|---|
| CN | 107016370 A | 8/2017 |
| CN | 107766824 A | 3/2018 |
| CN | 108805046 A | 11/2018 |

* cited by examiner

METHOD, DEVICE, APPARATUS AND STORAGE MEDIUM FOR FACIAL MATCHING

CROSS-REFERENCE TO RELATED APPLICATION

The present application claims the priority of a Chinese patent application No. 201810516485.8 filed on May 25, 2018. Herein, the content disclosed by the Chinese patent application is incorporated in full by reference as a part of the present application.

TECHNICAL FIELD

Embodiments of the present disclosure relate to a method, a device, an apparatus, and a storage medium for facial matching.

BACKGROUND

In recent years, facial recognition technology receives wide attention. While facial recognition is performed, in order to enhance accuracy of facial recognition, good lighting condition is needed during acquisition of facial images, and acquired human face images should be frontal-view and clear. In some cases, if facial features of a recognized image are changed, for example, if photographing angle and lighting condition are changed and/or some appearance features (makeup, hair style, beard, scar, glasses, etc.) of human face are changed, accuracy in facial recognition would be reduced, so that a result of fault recognition is likely to occur.

SUMMARY

The embodiments of the present disclosure provide a method for facial matching. The method comprises acquiring an image to be matched; conducting matching for the image to be matched based on at least one of an original sample database and an associative sample database; and outputting a final matching result, wherein the original sample database includes an original sample image, and the associative sample database includes an associative sample image which is formed by adding an associative feature to the original sample image.

For example, obtaining the original sample database and the associative sample database comprises: acquiring the original sample image; obtaining the original sample database based on the original sample image; adding the associative feature to the original sample image in the original sample database and generating the associative sample image, to obtain the associative sample database.

For example, the associative feature comprises at least one of scene, glasses, accessory, clothing, hair style.

For example, the method more facial matching further comprising: conducting matching for the image to be matched based on a feature sample database, the feature sample database including a feature sample image, wherein obtaining the feature sample database comprises: changing a local feature of the associative sample image in the associative sample database and generating the feature sample image, to obtain the feature sample database.

For example, the changing a local feature of the associative sample database in the associative sample database comprises: removing the local feature in the associative sample image and/or changing at least one of a size and a shape of the local feature, wherein the local feature includes at least one of nevus, scar, beard, eyebrow shape, mouth, nose, eye, and ear.

For example, conducting matching for the image to be matched comprises: matching the image to be matched with the original sample image in the original sample database, and determining a first matching result; generating a final matching result based on the first matching result if the first matching result is greater than or equal to a first threshold.

For example, if the first matching result is smaller than the first threshold, conducting matching for the image to be matched further comprises: matching the image to be matched with the associative sample image in the associative sample database, and determining a second matching result; determining a third matching result based on the first matching result and the second matching result; generating the final matching result based on the third matching result if the third matching result is greater than or equal to a second threshold, wherein the second threshold is the same as or different from the first threshold.

For example, determining the third matching result comprises: setting a first weight value for the first matching result; setting a second weight value for the second matching result; determining a third matching result based on a product of the first matching result and the first weight value and a product of the second matching result and the second weight value, wherein the first weight value is greater than the second weight value.

For example, if the third matching result is smaller than the second threshold, conducting matching for the image to be matched further comprises: matching the image to be matched with the feature sample image in the feature sample database, and determining a fourth matching result; determining a fifth matching result based on the first matching result, the second matching result and the fourth matching result; generating the final matching result based on the fifth matching result if the fifth matching result is greater than or equal to the third threshold, wherein the third threshold is the same as or different from the second threshold.

For example, the determining a fifth matching result comprises: setting a third weight value for the first matching value; setting a fourth weight value for the second matching value; setting a fifth weight value for the fourth matching value; determining the fifth matching result based on a product of the first matching result and the third weight value, a product of the second matching result and the fourth weight value, and a product of the fourth matching result and the fifth weight value, wherein the third weight value is greater than the fourth weight value, and the fifth weight value.

For example, the method for facial matching further comprising updating at least one of the original sample database, the associative sample database, and the feature sample database based on the image to be matched.

The embodiments of the present disclosure also provide a device for facial recognition. The device comprises an input module, configured to acquire an image to be matched; a weight analysis module, configured to conduct matching for the image to be matched based on at least one of an original sample database and an associative sample database; and an output module, configured to output a final analysis result, wherein the original sample database includes an original sample image, and the associative sample database includes an associative sample image which is formed by adding an associative feature to the original sample image.

For example, the input module is further configured to acquire the original sample database, and the device further comprises: an algorithm processing module, configured to; obtain the original sample database based on the original sample image; add the associative feature to the original sample image in the original sample database and generate the associative sample image, to obtain the associative sample database; a sample database storage module, configured to store the sample database, wherein the associative feature comprises at least one of scene, glasses, accessory, clothing, hair style.

For example, the weight analysis module is further configured to conduct matching of the image to be matched based on a feature sample database, wherein the algorithm processing module is further configured to: change a local feature of the associative sample image in the associative sample database and generate a feature sample image, to obtain the feature sample database, wherein the local feature includes at least one of nevus, scar, beard, eyebrow shape, mouth, nose, eye, and ear.

For example, weight analysis module is further configured to: match the image to be matched with the original sample image in the original sample database, and determine a first matching result; generate a final matching result based on the first matching result if the first matching result is greater than or equal to a first threshold.

For example, if the first matching result is smaller than the first threshold, the weight analysis module is further configured to: match the image to be matched with the associative sample image in the associative sample database, and determine a second matching result; determine a third matching result based on the first matching result and the second matching result; generate the final matching result based on the third matching result if the third matching result is greater than or equal to a second threshold, wherein the second threshold is the same as or different from the first threshold, determining, by the weight analysis module, the third matching result comprises: setting a first weight value for the first matching result; setting a second weight value for the second matching result; determining a third matching result based on a product of the first matching result and the first weight value and a product of the second matching result and the second weight value, wherein the first weight value is greater than the second weight value.

For example, if the third matching result is smaller than the second threshold, the weight analysis module is further configured to: match the image to be matched with the feature sample image in the feature sample database, and determine a fourth matching result; determine a fifth matching result based on the first matching result, the second matching result and the fourth matching result; generate the final matching result based on the fifth matching result if the fifth matching result is greater than or equal to the third threshold, wherein the third threshold is the same as or different from the second threshold, determining, by the weight analysis module, by the fifth matching result comprises: setting a third weight value for the first matching value; setting a fourth weight value for the second matching value; setting a fifth weight value for the fourth matching value; determining the fifth matching result based on a product of the first matching result and the third weight value, a product of the second matching result and the fourth weight value, and a product of the fourth matching result and the fifth weight value, wherein the third weight value is greater than the fourth weight value, and the fifth weight value.

For example, the algorithm processing module is further configured to update at least one of the original sample database, the associative sample database, and the feature sample database based on the image to be matched.

The embodiments of the present disclosure also provide an apparatus for facial matching. The apparatus comprises at least one processor; and at least one storage, wherein the storage is stored with computer readable code, wherein the computer readable code executes the above mentioned method for facial matching when being run by the at least one processor, or implements the above mentioned device for facial matching.

The embodiments of the present disclosure also provide a non-transient computer readable storage medium in which computer readable code is stored, wherein the computer readable code executes the above mentioned method for facial matching when being run by one or more processors.

BRIEF DESCRIPTION OF THE DRAWINGS

In order to describe technical solutions in embodiments of the present disclosure or in the prior art more clearly, accompanying figures that need to be used in description of the embodiments or the prior art will be introduced simply. Obviously, figures in the following description are just some embodiments of the present disclosure. For those ordinary skilled in the art, other figures can also be obtained according to these figures without paying any inventive labor.

DETAILED DESCRIPTION

Figure 1:
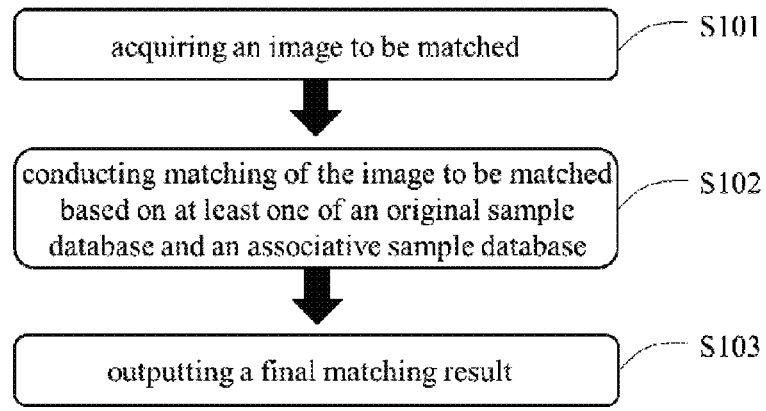
FIG. 1 shows a flowchart of a method for facial matching according to some embodiments of the present disclosure.

Technical solutions in embodiments of the present disclosure will be described clearly and completely by combining with accompanying figures in the embodiments of the present disclosure. Obviously, the embodiments described below are just a part of embodiments of the present disclosure, but not all the embodiments. Based on the embodiments in the present disclosure, all the other embodiments obtained by those ordinary skilled in the art without paying any creative labor belong to the scope sought for protection in the present disclosure.

"First", "second" and similar words used in the present disclosure do not indicate any sequence, quantity or importance, but they are just used to distinguish different components. Also, "include", "comprise" and other similar words mean that an element or an object appearing prior to the word contains an element or an object or its equivalent listed subsequent to the word, but does not exclude other elements or objects.

Flowcharts are used in the present disclosure to describe steps of a method according to embodiments of the present disclosure. It shall be understood that previous or subsequent steps are not certainly executed accurately in sequence. On the contrary, various steps can be processed in reverse sequence or processed simultaneously. At the same time, other operations can also be added to these processes, or one or several steps are removed from these processes.

With the development of image recognition technology and technologies of computer hardware or the like, a growing number of devices and products adopt a facial recognition solution to take the place of a traditional verification solution, such as card verification, fingerprint identification, etc. For example, facial identification can be adopted in a mobile phone to unlock a screen, so as to take the place of the conventional fingerprint recognition, which not only increases convenience and entertainment of the product, but also saves space occupied by a key used for fingerprint recognition. Additionally, the facial recognition technology is increasingly applied to other fields, for example, fields of intelligent security protection, police criminal detection, punch sign, virtual reality, augmented reality, etc. For example, a police criminal detection department can adopt facial recognition technology to identify a criminal suspect in an image database.

In the above mentioned product that has applied the facial recognition technology, accuracy of identification becomes a critical factor influencing effects of the product. In some cases, facial matching can be performed between existing images in the sample database and acquired facial images, and facial recognition can be performed according to the result of facial matching. Therefore, accuracy of facial matching would influence the result of facial recognition. As a general rule, if lighting condition is quite good in the process of acquiring images, and the acquired images to be matched are frontal-view and clear, then accuracy of facial matching is relatively high, i.e., being capable of obtaining a correct recognition result. However, in the actual situation, it is difficult to guarantee that images acquired each time are able to contain complete, frontal-view and clear facial features of images to be matched. At this time, phenomenon of match errors would occur to the above facial recognition product. For example, a mobile phone cannot recognize a user when being unlocked by facial recognition, which results in that the user is unable to use the mobile phone normally, thereby influencing the user experience.

For this reason, the above product can require that the acquired images used for facial matching contain facial features as much as possible when it is designed. For example, when images are being acquired, the user of the mobile phone can be reminded to face towards the camera of the mobile phone in the environment of good lighting, in order to improve accuracy of recognition.

Additionally, in different periods of time, facial features of the user would be changed constantly. For example, as for a female user, changes to makeup, hair style, eyebrow shape would influence the overall effect of the face. As for a male user, changes to features of beard and glasses and so on would also influence the overall profile of the face. The changes of these features would influence the accuracy of facial matching, or even causes error recognition.

Therefore, in order to improve accuracy of facial matching, there is provided in the present disclosure a method for facial matching. Firstly, an original sample database is constructed by acquiring an original sample image/original sample images of a human face/human faces comprehensively and clearly as much as possible. Then, on the basis of the original sample database, an associative sample database is obtained by adding an associative feature/associative features to the original sample image(s). Further, on the basis of the associative sample database, a feature sample database is obtained by changing some features of the associative sample image(s). Based on the original sample database, the associative sample database and the feature sample database, in the process of matching the collected humane face images, a final matching result is calculated by setting weight values for matching results based on the original sample database, the associative sample data base and the feature database respectively, so as to improve accuracy of facial matching.

FIG. 1 shows a flowchart of a method for facial matching according to some embodiments of the present disclosure. Firstly, in step S101, an image to be matched I is acquired. Herein, the acquired image I to be matched can substantially reflect facial features accurately. For example, when the image I to be matched is acquired, a frontal-view image of a human face can be acquired, and light intensity and acquisition angle are appropriate. In this way, the acquired image I to be matched is advantageous for obtaining a more accurate recognition result.

Next, in step S102, match is performed on the image I based on at least one of an original sample database B1 and an associative sample database B2. Herein, the original sample database comprises an original sample image/original sample images, and the associative sample database comprises an associative sample image/associative sample images which is/are formed by adding the associative feature(s) to the original sample image(s).

According to one embodiment of the present disclosure, the image I to be matched can be firstly matched with the original sample image(s) in the original sample database B1 by utilizing an image matching algorithm, to obtain a matching result A. After that, the image I is matched with the associative sample image(s) in the associative sample database B2 by utilizing the image matching algorithm, to obtain a matching result B. It needs to be noted that other sequences can also be adopted to perform the above process of image matching. For example, the image I to be matched can be matched with the original sample image(s) in the original sample database B1 and the associative sample image(s) in the associative sample database B2 simultaneously. For example, also, the image I to be matched can be firstly matched with the associative sample image(s) in the associative sample database B2, and then be matched with the original sample image(s) in the original sample database B1. This does not form a limitation to the present disclosure, and thus no further details are given herein.

Finally, in step S103, a final matching result D is output. In the embodiments according to the present disclosure, the final matching result D can be generated based on at least part of the matching results A and B obtained in step S102. The final matching result D indicates whether the image I to be matched passes verification of a product that supports facial recognition. For example, the image I to be matched of the user can be acquired by utilizing a camera of a mobile phone. If the final matching result D output based on the matching results A and B of the image I to be matched indicates that the user passes verification of facial recognition, then the user can unlock or use this product. If the final matching result D indicates that the user fails to pass verification of facial recognition, then a verification failure is displayed, and the user cannot lock or use the product, and it is prompted whether to re-perform processes of acquiring and verifying the image I to be matched.

Figure 2:
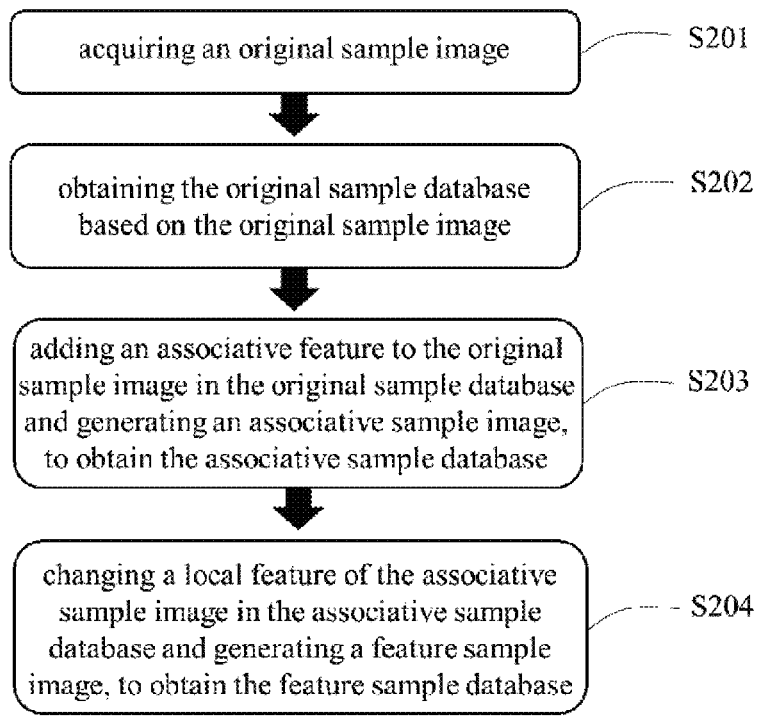
FIG. 2 shows a flowchart of obtaining an original sample database and an associative sample database according to some embodiments of the present disclosure.

FIG. 2 shows a flowchart for obtaining the original sample database and the associative sample database according to some embodiments of the present disclosure. Firstly, in step S201, an original sample image is acquired. Herein, a high-definition original sample image including facial features as much as possible, for example, including facial outline, ear, and special mark points such as nevus and scar, etc., can be acquired by utilizing an image acquisition device.

Next, in step S202, the original sample database B1 is obtained based on the acquired original sample image(s) as described above. For example, the acquired facial images can be stored in the original sample database B1 as a whole, or the acquired facial features can be classified, and the acquired facial features are stored according to different categories. The image matching algorithm can be trained based on different categories of facial features to enhance accuracy of matching. For example, the depth learning algorithm can be trained based on one category of facial features (such as, eyes), so as to improve accuracy of the algorithm regarding eye feature recognition.

Next, in step S203, an associative feature is added to the original sample image(s) in the original sample database B1, to obtain the associative sample database B2. Herein, the associative feature can include scene, glasses, accessories, clothing, hair style, etc. For example, the associative feature may be a place where the user visits frequently, or accessories usually wore by the user, and so on. By adding these associative features to the original sample image(s), features contained in the original sample image(s) are enriched. When facial recognition is performed by utilizing these associative sample images including these associative features, matching accuracy can be improved.

Figure 3:
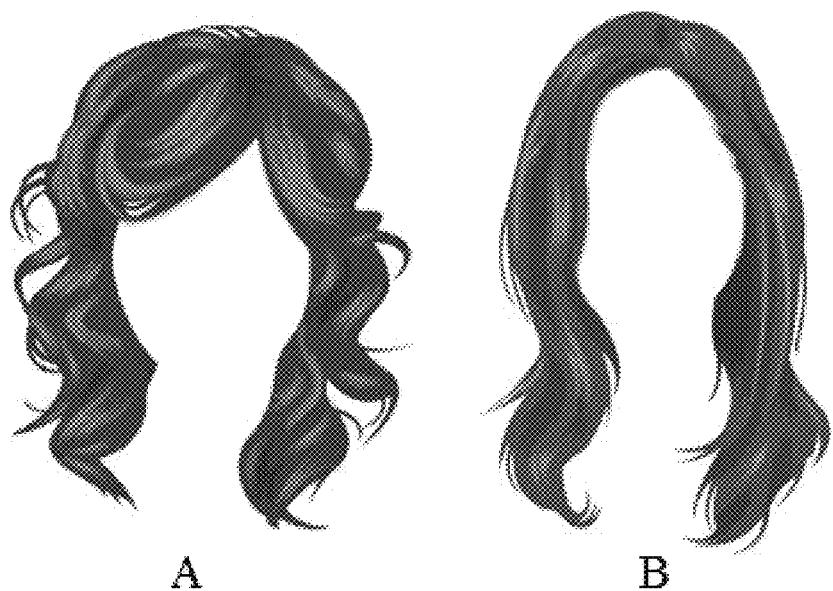
FIG. 3 shows a schematic diagram for generating associative features of the associative sample database according to some embodiments of the present disclosure.

FIG. 3 shows a schematic diagram for generating associative features of the associative sample database according to some embodiments of the present disclosure. Schematically, the associative sample database is described in the text by taking the associative feature being hair style as an example. It needs to be noted that the associative feature can further comprise other features, and it does not form a limitation to the present disclosure.

As shown in FIG. 3, a female user is likely to change her hair style frequently. When the hair style of the user changes a lot, it would probably result in that a face recognition product cannot recognize the features of the user accurately, or even a wrong recognition result occurs, for example, a result of failure matching is outputted. This would result in that the user is unable to use the product normally, thereby reducing the user experience greatly. By utilizing the method provided in the embodiments of the present disclosure, a hair style feature can be added to the original sample image(s) in the original sample database. For example, when the original sample database B1 is generated, the hair style of the user is a hair style A as shown in FIG. 3. After a period of time, the hair style of the user may be changed into a hair style B. At this time, the hair style A included in all or part of original sample images in the original sample database B1 can be changed into the hair style B, to obtain the associative sample database B2. Therefore, when the hair style of the user is changed, a more accurate matching result can be obtained by utilizing the acquired facial images of the user to match with images in the associative sample database b2, which avoids the error recognition result from occurring due to change of the hair style of the user.

Returning back to FIG. 2, according to one embodiment of the present disclosure, the method for facial matching further comprises matching an image to be matched based on a feature sample database. The feature sample database comprises a feature sample image/feature sample images. As shown in FIG. 2, in step S204, local features of associative sample image(s) in the associative sample database B2 are changed and the feature sample image(s) are generated, to obtain a feature sample database B3.

According to the embodiment of the present disclosure, the local features can comprise nevus, scar, beard, eyebrow shape, mouth, nose, eye, ear, etc. For example, changing local features of the associative sample image(s) B2 in the associative sample database can refer to removing some local features in the associative sample image(s), or changing size or shape of some local features. The change to local features herein can be performed under control, for example, the change of the local features can be performed under supervision by setting a rule. In this way, even if a certain local feature (for example, eyebrow shape) of the user is changed, the associative sample image(s) in the feature sample database whose local feature has been changed can also be used to obtain a more accurate facial matching result.

Figure 4A:
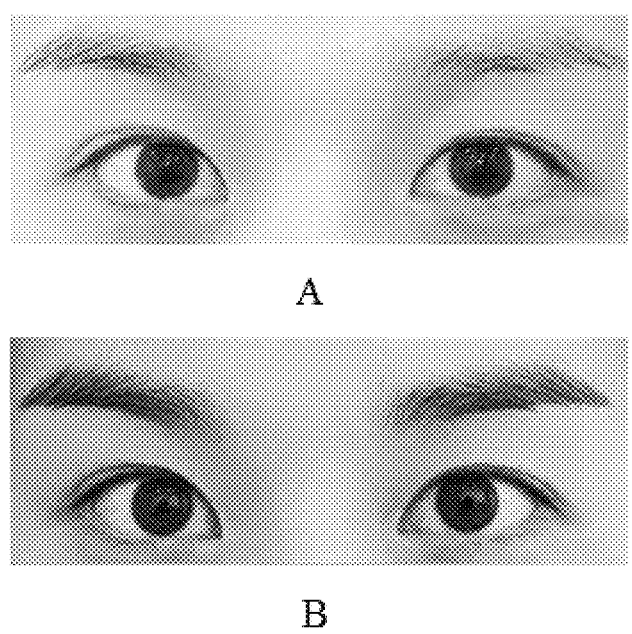
FIGS. 4A and 4B show a schematic diagram of a local feature according to some embodiments of the present disclosure.
Figure 4B:
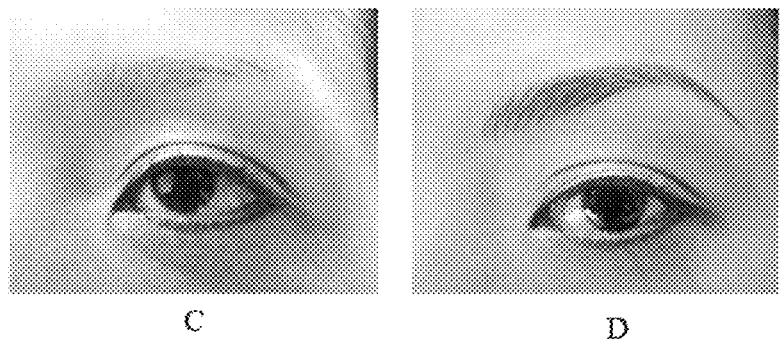

FIGS. 4A and 4B show schematic diagrams of a local feature according to some embodiments of the present disclosure. The feature sample database B3 is described by taking the local feature being the eyebrow shape as an example. It needs to be noted that the local feature can be any other local feature, and this does not form a limitation to the present disclosure.

Figure 5:
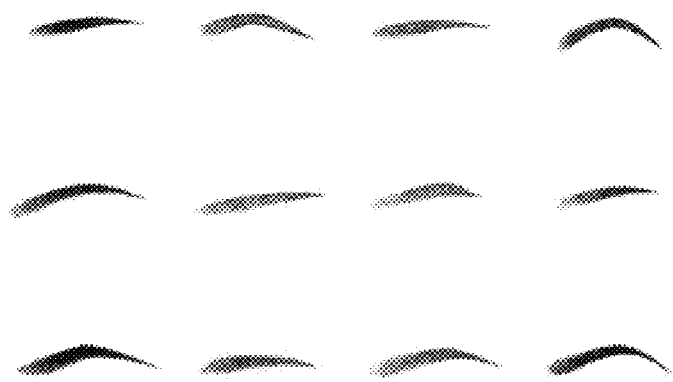
FIG. 5 shows another schematic diagram of local features according to some embodiments of the present disclosure.

As shown in FIG. 4A or 4B, the change of the eyebrow shape would influence a facial entire structure of a person to a great extent. For example, when the user changes from an eyebrow shape A into an eyebrow shape B, or changes from an eyebrow shape C into an eyebrow shape D, if image matching is performed by utilizing only the original sample image(s) and the associative sample image(s) in the original or associative sample database, then a wrong matching result is likely to be obtained, so that the user who has changed his/her eyebrow shape cannot use the product normally. According to the embodiments of the present disclosure, a local feature for example the eyebrow shape in the associative sample image(s) can be changed on the basis of the associative sample database B2, to obtain the feature sample database B3. For example, a plurality of eyebrow shapes that might be used by users can be firstly determined, as shown in FIG. 5, and then the eyebrow shapes in FIG. 5 are applied to all or part of associative sample images by utilizing an image processing algorithm. That is, feature sample image(s) in the feature sample database B3 include various eyebrow shapes users may have. Therefore, when the acquired image I to be matched is matched by utilizing the feature sample database B3, a more accurate recognition result could be obtained.

Likewise, the local feature can also be a scar. The feature sample database B3 is constructed by utilizing the image processing algorithm to remove or fade the scar in some associative sample images in the associative sample database B2, so that when the scar of the user is eliminated, an accurate recognition result can also be obtained by utilizing the feature sample database. In another example, the change of the local feature may be a change of size of eyes, length of beard and so on, and it is not listed one by one herein. It needs to be noted that the change of the local feature is a limited change.

According to the embodiments of the present disclosure, the above obtained original sample database, associative sample database and feature sample database can be applied to a product that supports facial recognition, so as to improve accuracy of matching.

According to one embodiment of the present disclosure, the process of utilizing the sample databases B1, B2, B3 to perform facial matching to output the final matching result D can be implemented by means of setting a weight value for the matching result of the sample databases B1, B2, B3 respectively.

Figure 6A:
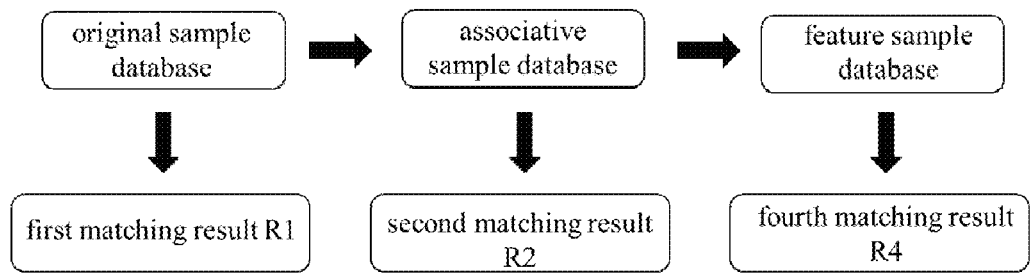
FIG. 6A shows a schematic diagram of one embodiment of performing image matching based on a sample database according to some embodiments of the present disclosure.
Figure 6B:
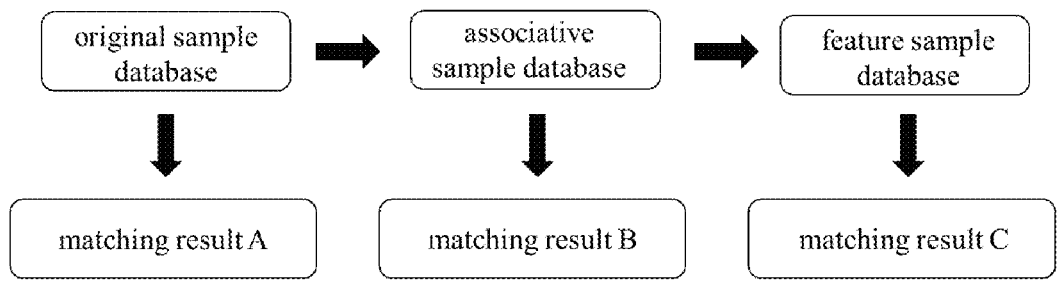
FIG. 6B shows a schematic diagram of another embodiment of performing image matching based on a sample database according to some embodiments of the present disclosure.

FIG. 6A shows a schematic diagram of one embodiment of performing image matching based on a sample database according to some embodiments of the present disclosure. FIG. 6B shows a schematic diagram of another embodiment of performing image matching based on a sample database according to some embodiments of the present disclosure. The image matching methods as shown in FIGS. 6A and 6B are just served as two embodiments according to the present disclosure, and do not form a limitation to the present disclosure. The process of performing image matching by utilizing the sample database based on the embodiment of the present disclosure can also be performed in other ways.

As shown in FIG. 6A, firstly, the acquired image I to be matched is matched with the original sample image(s) in the original sample database B1, and a first matching result R1 is obtained. The first matching result R1 indicates a matching degree of the image I to be matched with the original sample image(s) in the original sample database B1. It can be determined whether a first matching result R1 passes recognition by means of comparing the first matching result R1 with a predetermined first threshold T1. For example, if the first matching result R1 is greater than or equal to the predetermined threshold value T1, then it is believed that the image I to be matched passes verification, that is, it means that the user has a right to unlock or use this product. At this time, according to the embodiments of the present disclosure, the first matching result R1 greater than or equal to the first threshold T1 can be directly determined as the final matching result, without performing a subsequent process of matching a second matching result with the feature sample database. Since the original sample image(s) in the original sample database B1 is generated based on a directly acquired original sample image(s), that is, it can be considered that compared with a matching result of the associative and feature sample databases, a matching result of the original sample database B1 has higher accuracy and reliability, for example, in the case of successful matching with the original sample database, a subsequent matching process may be performed no longer, so as to save time for the process.

If the first matching result R1 is smaller than the first threshold T1, it can be considered that the image I to be matched is not matched with the original sample database B1 successfully. It is likely to be caused by the change of the associative feature or the local feature of the user, for example, the user changes glasses or makes a new eyebrow shape and so on. In this case, the image I to be matched can be matched with the associative sample image(s) in the associative sample database B2, so as to determine a second matching result R2. A third matching result R3 determined by combining the first matching result R1 with the second matching result R2 can be utilized to determine whether the image I to be matched is recognized successfully. For example, the above determination can be performed by predetermining the second threshold T2. For example, if the third matching result R3 is greater than or equal to the second threshold T2, the third matching result R3 is determined as the final matching result D. In this case, the third matching result R3 indicates that the image I of the user to be matched has passed the facial recognition verification, so that the process of matching the feature sample database B3 would not be performed. Herein, the second threshold T2 may be the same as the first threshold T1, or may be different from it. For example, it can be set reasonably according to the requirement for accuracy of facial recognition. For example, if the requirement for accuracy of recognition is relatively high, then the value of the second threshold T2 can be increased.

According to one embodiment of the present disclosure, a first weight value W1 can be set for the first matching result R1, a second weight value W2 can be set for the second matching result R2, and the third matching result R3 is determined based on a product of the first matching result R1 and the first weight value W1 and a product of the second matching result R2 and the second weight value W2. For example, the third matching result R3 may be a weighted sum of the first matching result R1 and the second matching result R2. Contributions of R1 and R2 to the third matching result R3 can be allocated based on the weight values W1 and W2. For example, since the associative sample image(s) in the associative sample database B2 is generated by adding an associative feature to the original sample image(s) of the original sample database B1. It can be regarded that reliability of the second matching result R2 is lower than that of the first matching result R1. Therefore, the first weight value W1 can be set as being greater than the second weight value W2.

If the third matching result R3 is smaller than the second threshold T2, matching the image I to be matched can further comprise matching the image I to be matched with the feature sample image(s) in the feature sample database B3, so as to determine a fourth matching result R4. After that, a fifth matching result R5 is determined based on the first matching result R1, the second matching result R2 and the fourth matching result R4. If the fifth matching result R5 is greater than or equal to the third threshold T3, the fifth matching result R5 is determined as a final matching result D. The fifth matching result indicates whether the acquired image I of the user to be matched passes verification of facial recognition. Herein, the third threshold T3 may be the same as the second threshold T2, or may be different from it, and it can be set reasonably according to the requirement for the accuracy of facial recognition. For example, if the requirement for accuracy of recognition is relatively high, then the value of the third threshold T3 can be increased.

Herein, the above process of determining the fifth matching result R5 can be implemented by setting the third weight value W3 for the first matching result R1, setting the fourth weight value W4 for the second matching result R2, and setting the fifth weight value W5 for the fourth matching result R4. After that, the fifth matching result R5 can be determined based on a product of the first matching result R1 and the third weight value W3, a product of the second matching result R2 and the fourth weight value W4, and a product of the fourth matching result R4 and the fifth weight value W5. For example, the third matching result R3 can be a weighted sum of the first matching result R1, the second matching result R2 and the fourth matching result R4.

According to one embodiment of the present disclosure, contributions of R1, R2 and R4 to the fifth matching result R5 can be allocated by the set weight values W3, W4 and W5. Since the associative sample image(s) in the associative sample database B2 is generated by adding an associative feature to the original sample image(s) of the original sample database B2, while the feature sample image(s) in the feature sample database B3 is generated by changing a local feature in the associative sample image(s) of the associative sample database B2, it can be regarded that reliability of the second matching result R2 is lower than that of the first matching result R1, while reliability of the fourth matching result R4 is lower than the second matching result R2. For example, the third weight value W3 can be set as being greater than the fourth weight value W4 and the fifth weight value W5. In other embodiments according to the present disclosure, the influence of the second matching result may not be taken into consideration when the fifth matching result R5 is determined, for example, it can be realized by setting the fourth weight value W4 as 0.

By adopting the matching method as shown in FIG. 6A, facial recognition of the image I to be matched can be realized based on sample databases B1, B2 and B3. Even if certain changes occur to facial features of the user, by utilizing the matching method as shown in FIG. 6A, error recognition can also be avoided from occurring, and an accurate recognition result can be obtained.

As shown in FIG. 6B, according to another embodiment of the present disclosure, the acquired image I to be matched can also be matched with the sample databases B1, B2, and B3 one by one, so as to obtain three matching results A, B, and C, and then the final matching result D is calculated based on the three obtained matching results. For example, the matching result D can be determined by means of setting a weight value respectively, for example, the final matching result D can be a weighted result of the matching results A, B, and C. This process is similar to the process as shown in FIG. 6A, and thus no further details are given herein.

According to the embodiments of the present disclosure, in the process of applying the sample databases B1, B2, and B3 to perform facial matching, the acquired image I to be matched can be further used to update the above databases. For example, after facial matching is performed on the acquired image I of the user to be matched for one time, the image I to be matched can be stored in the original sample database as the original sample image(s) in the original sample database B1. In other words, the sample images in the sample databases B1, B2, and B3 are constantly updated and supplemented in the process of the facial recognition application, and the updated sample database is favorable for obtaining a more accurate matching result when matching is performed. In some embodiments, the image I to be matched having passed facial recognition can be used to update the sample databases.

In other embodiments according to the present disclosure, the process of calculating the final matching result D can further comprise setting feature weight values for some facial features. For example, in the process of matching with the original sample database B1, a relatively high feature weight value can be set for an evident facial feature such as eyebrow, eyes, ears, noses, mouth, and nevus or the like, while a relatively low feature weight value can be set for those features easy to be changed such as scar, beard, glasses, etc. Or, different feature weight values can be set based on gender. For example, the feature weight values of facial features easy to be changed can be reduced correspondingly based on gender. For example, a relatively low feature weight value is set for beard of a male, while a relatively high feature weight value is set for eyebrow, and periocular position of a female.

In addition, in the process of performing image matching by utilizing the associative sample database B2, feature weight values can also be set for some unique features respectively. For example, as described above, since the associative sample image(s) in the associative sample database B2 is generated based on the original sample database B1, reliability of the matching result of the associative sample database B2 is lower than reliability of the matching result of the original sample database B1, and then it can be set that the first weight value W1 is higher than the second weight value W2. On such a basis, a feature weight value can be allocated to an associative feature added to the associative sample database B2, for example, it can be set that the feature weight value of hair style can be set as being lower than the feature weight value of glasses.

In the process of utilizing the feature sample database B3 to perform image matching, weight values W3, W4, and W5 can be set for the original sample database, the associative sample database and the feature sample database respectively. On such a basis, a feature weight value can also be set for a changed local feature in the feature sample database B3. For example, the feature weight value of the changed eyebrow shape in the feature sample data B3 can be increased, or the feature weight value of the eyebrow shape in the original sample database B1 can also be reduced correspondingly, so as to increase the effect of the matching result of the changed local feature on the final matching result D. According to other embodiments of the present disclosure, in the case that the feature sample image(s) in the feature sample database B3 is obtained by removing some local features in the associative sample image(s), for example, the feature sample image(s) is/are obtained by removing features such as nevus, scar and so on in the associative sample image(s) of the associative sample database B2, a feature weight value of the removed feature can be increased in the fourth matching result R4 correspondingly, or the feature weight value of the removed feature can be reduced in the second matching result R2 correspondingly.

By means of setting a weight value for the matching result of the sample database or setting a feature weight value for a certain feature, a more accurate facial matching result can be obtained based on the first, second and feature sample database. Even if when certain changes occur to facial features of the object to be matched, an accurate matching result can also be obtained based on the generated associative or feature sample database, which avoids error matching from occurring, and is helpful to improve using experience of the user.

Figure 7:
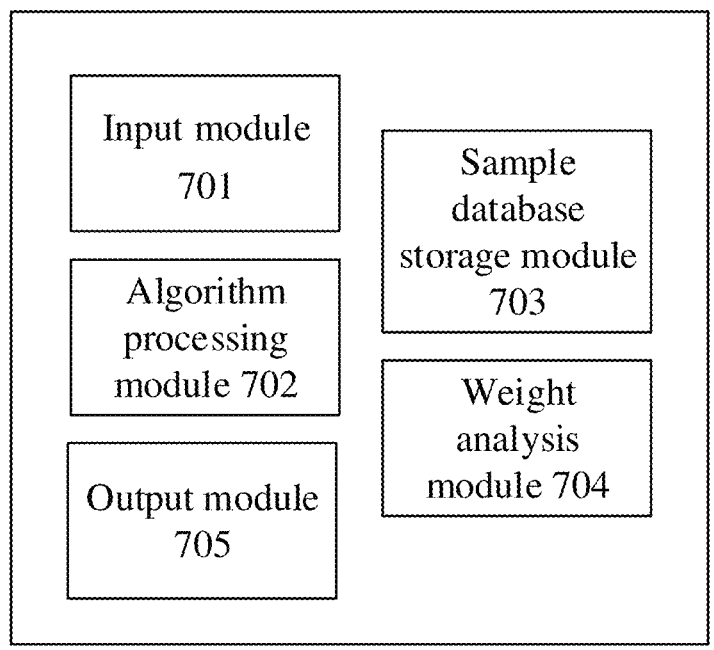
FIG. 7 shows a schematic diagram of structure of a device for facial matching according to some embodiments of the present disclosure.

FIG. 7 shows a schematic diagram of structure of a device for facial matching according to some embodiments of the present disclosure. According to one embodiment of the present disclosure, the device can comprise an input module 701, a weight analysis module 704 and an output module 705. Herein, the input module 701 can be configured to acquire the image I to be matched. The weight analysis module 704 can be configured to match the image I to be matched acquired by the input module 701 based on at least one of the original sample database and the associative sample database. Herein, the output module 705 can be configured to output the final matching result. Herein, the original sample database comprises the original sample image(s), and the associative sample database comprises the associative sample image(s) which is, are formed by adding the associative feature(s) to the original sample image(s). In some embodiments, the input module is further configured to acquire the original sample image(s).

In some embodiments, the device provided in the present disclosure further comprises an algorithm processing module 702 and a sample database storage module 703. Herein, the algorithm processing module 702 is configured to obtain the original sample database based on the original sample image(s), and is further configured to add the associative feature(s) to the original sample image(s) in the original sample database to generate the associative sample image(s), to obtain an associative sample database. Herein, the associative feature comprises at least one of scene, glasses, accessories, clothing, and hair style.

In some embodiments, the weight analysis module 704 is further configured to match the image to be matched based on the feature sample database.

Herein, the algorithm processing module 702 is further configured to change a local feature of the associative sample image(s) in the associative sample database and generate the feature sample image(s), to obtain a feature sample database. Changing, by the algorithm processing module 702, a local feature of the associative sample image(s) in the associative sample database comprises: removing the local feature in the associative sample image(s) and change at least one of size and shape of the local feature, of which the local feature can comprise at least one of nevus, scar, beard, eyebrow, mouth, nose, eyes, and ear.

The sample database storage module 703 is configured to store a sample database, for example, the original sample database, the associative sample database and the feature sample database described above.

Herein, functions of the device for facial matching are introduced by taking a face recognition application used for unlocking a mobile phone as an example. Firstly, the input module 701 acquires the image I to be matched. For example, the input module 701 can comprise an image acquisition unit, which may be for example a front camera of the mobile phone. After the image I of the user to be matched is acquired, the weight analysis module 704 matches the acquired image I to be matched stored in the sample database storage module 703 and sets a weight value for a matching result of each sample database. After that, the output module 705 outputs the final matching result D. The process of matching and setting the weight value is as shown in FIGS. 6A and 6B, and thus no further details are given herein. The final matching result D may indicate whether the user has passed verification of facial recognition. In some embodiments, the final matching result D can also indicate a percentage of the facial matching degree based on the matching result of the sample database, for example, the output result can include 70% similarity. In some other embodiments, the final matching result D can further indicate specific features not passing the image matching, for example, a matching coefficient of eyes is relatively low, or the like. It is favorable for the user to adjust the photographing angle or lighting angle of eyes upon acquiring the images when the user performs facial recognition next time, so as to be advantageous to obtain an accurate recognition result.

Additionally, the algorithm processing module 702 in the image matching device as shown in FIG. 7 can be further configured to update the above sample databases by utilizing the acquired image I to be matched in the process of using the facial recognition application. For example, the algorithm processing module 702 can store the acquired image I to be matched in the sample database storage module 703 as the original sample image(s). For another example, the algorithm processing module 702 can perform the processing as shown in FIG. 2 on the image I to be matched, for example, adding an associative feature or changing a local feature, etc., to generate corresponding associative sample image(s) and feature sample image(s).

Figure 8:
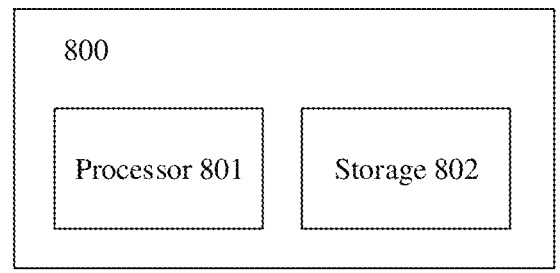
FIG. 8 shows a schematic diagram of an apparatus for facial matching according to some embodiments of the present disclosure.

FIG. 8 shows a schematic diagram of an apparatus 800 for facial matching according to some embodiments of the present disclosure. The apparatus 800 for facial matching can comprise at least one processor 801 and at least one storage 802.

Herein, the storage 802 is stored with a computer readable code. The computer readable code executes the method for facial matching as described above when being ran by the at least processor 801. According to the embodiments of the present disclosure, there is further provided a non-transient computer readable storage medium, in which a computer readable code is stored. The computer readable code executes the method for facial matching when being run by one or more processors.

There is provided in the present disclosure a method for facial matching, comprising: acquiring an image to be matched; conducting matching for the image to be matched based on at least one of an original sample database and an associative sample database; and outputting a final matching result, of which the original sample database comprises the original sample image, and the associative sample database comprises an associative sample image which is formed by adding an associative feature to the original sample image. Herein, obtaining the original sample database and the associative sample database comprises: acquiring the original sample image; obtaining the original sample database based on the original sample image; adding the associative feature to the original sample image in the original sample database to generate the associative sample image, to obtain the associative sample database. The method further comprises: conducting matching for the image to be matched based on the feature sample database, the feature sample database including the feature sample image, of which obtaining the feature sample database comprises: changing the local feature of the associative sample image in the associative sample database, to obtain the feature sample database.

In the process of performing image matching based on the above obtained sample database, the final matching result can be determined by setting weight values for the matching results obtained based on different sample databases. Since the possible associative feature is added to the original sample image, or the local feature possible to be changed in the associative image is changed, recognition accuracy of the image to be matched can be improved. The method for facial recognition is applicable to the field of facial recognition, and fields relating to facial recognition such as intelligent home protection, political criminal detection, smart card reader, smart glasses, AR/VR, etc.

Additionally, those skilled in the art can understand that respective aspects of the present application can be explained and descried through several types or situations having patentability, including a combination of any new and useful process, machine, product or subject, or any new or helpful improvement to the combination. Correspondingly, respective aspects of the present application can executed completely by a hardware, or can be executed completely by a software (including firmware, resident software, microcode, etc.), or can be executed by a combination of the hardware and software. The hardware or software can be referred to as "data block", "module", "engineer", "unit", "component" or "system". In addition, respective aspects of the present application can be represented as a computer product located in one or more computer readable medium. The computer product comprises a computer readable program code.

Unless otherwise defined, all terms (including technical and scientific terms) used herein have the meanings as the same as those meanings commonly understood by those ordinary skilled in the art. It shall be further understood that those terms such as defined in general dictionaries shall be explained as having meanings consistent with meanings in the context of related technology, but shall not be explained by idealized or formalized meanings, unless otherwise explicitly defined.

The above are descriptions of the present disclosure, but shall not be considered as limitations to the present disclosure. Although several exemplary embodiments of the present disclosure are described, it is easy for those skilled in the art to understand that various amendments can be made to the exemplary embodiments without departing from novel teachings and advantages of the present disclosure. Therefore, all these amendments intend to be included within the scope of the present disclosure as defined in the Claims. It shall be understood that the above are the descriptions of the present disclosure, but shall not be considered as being limited to specific disclosed embodiments. Furthermore, amendments made to the embodiments and other embodiments of the present disclosure shall intend to be included within the scope of the Claims. The present disclosure is defined by the Claims and equivalents thereof.

What is claimed is:

1. A method for facial matching, comprising:
   acquiring an image to be matched;
   conducting matching for the image to be matched based on at least one of an original sample database and an associative sample database; and
   outputting a final matching result,
   wherein the original sample database includes an original sample image, and the associative sample database includes an associative sample image which is formed by adding an associative feature to the original sample image,
   conducting matching for the image to be matched comprises:
   matching the image to be matched with the original sample image in the original sample database, and determining a first matching result;
   generating a final matching result based on the first matching result when the first matching result is greater than or equal to a first threshold,
   wherein when the first matching result is smaller than the first threshold, conducting matching for the image to be matched further comprises:
   matching the image to be matched with the associative sample image in the associative sample database, and determining a second matching result;
   determining a third matching result based on the first matching result and the second matching result;
   generating the final matching result based on the third matching result when the third matching result is greater than or equal to a second threshold,
   wherein the second threshold is the same as or different from the first threshold.

2. The method according to claim 1, wherein obtaining the original sample database and the associative sample database comprises:
   acquiring the original sample image;
   obtaining the original sample database based on the original sample image;
   adding the associative feature to the original sample image in the original sample database and generating the associative sample image, to obtain the associative sample database.

3. The method according to claim 2, wherein
   the associative feature comprises at least one of scene, glasses, accessory, clothing, hair style.

4. The method according to claim 1, further comprising:
   conducting matching for the image to be matched based on a feature sample database, the feature sample database including a feature sample image, wherein obtaining the feature sample database comprises:
   changing a local feature of the associative sample image in the associative sample database and generating the feature sample image, to obtain the feature sample database.

5. The method according to claim 4, wherein the changing a local feature of the associative sample database in the associative sample database comprises:
   removing the local feature in the associative sample image and/or changing at least one of a size and a shape of the local feature, wherein the local feature includes at least one of nevus, scar, beard, eyebrow shape, mouth, nose, eye, and ear.

6. The method according to claim 4, further comprising updating at least one of the original sample database, the associative sample database, and the feature sample database based on the image to be matched.

7. The method according to claim 1, wherein determining the third matching result comprises:
   setting a first weight value for the first matching result;
   setting a second weight value for the second matching result;
   determining a third matching result based on a product of the first matching result and the first weight value and a product of the second matching result and the second weight value,
   wherein the first weight value is greater than the second weight value.

8. The method according to claim 1, wherein when the third matching result is smaller than the second threshold, conducting matching for the image to be matched further comprises:
   matching the image to be matched with the feature sample image in the feature sample database, and determining a fourth matching result;
   determining a fifth matching result based on the first matching result, the second matching result and the fourth matching result;
   generating the final matching result based on the fifth matching result when the fifth matching result is greater than or equal to the third threshold,
   wherein the third threshold is the same as or different from the second threshold.

9. The method according to claim 8, wherein the determining a fifth matching result comprises:
   setting a third weight value for the first matching value;
   setting a fourth weight value for the second matching value;
   setting a fifth weight value for the fourth matching value;
   determining the fifth matching result based on a product of the first matching result and the third weight value, a product of the second matching result and the fourth weight value, and a product of the fourth matching result and the fifth weight value,
   wherein the third weight value is greater than the fourth weight value, and the fifth weight value.

10. An apparatus for facial matching, comprising:
at least one processor; and
at least one storage,
wherein the storage is stored with computer readable code, wherein the computer readable code executes the method for facial matching according to claim 1 when being run by the at least one processor.

11. A non-transient computer readable storage medium in which computer readable code is stored, wherein the computer readable code executes the method for facial matching according to claim 1 when being run by one or more processors.

12. A device for facial recognition, comprising:
an input module, configured to acquire an image to be matched;
a weight analysis module, configured to conduct matching for the image to be matched based on at least one of an original sample database and an associative sample database; and
an output module, configured to output a final analysis result,
wherein the original sample database includes an original sample image, and the associative sample database includes an associative sample image which is formed by adding an associative feature to the original sample image,
the weight analysis module is further configured to:
match the image to be matched with the original sample image in the original sample database, and determine a first matching result;
generate a final matching result based on the first matching result when the first matching result is greater than or equal to a first threshold,
wherein when the first matching result is smaller than the first threshold, the weight analysis module is further configured to:
match the image to be matched with the associative sample image in the associative sample database, and determine a second matching result;
determine a third matching result based on the first matching result and the second matching result;
generate the final matching result based on the third matching result when the third matching result is greater than or equal to a second threshold,
wherein the second threshold is the same as or different from the first threshold.

13. The device according to claim 12, wherein the input module is further configured to acquire the original sample database, and the device further comprises:
an algorithm processing module, configured to;
obtain the original sample database based on the original sample image;
add the associative feature to the original sample image in the original sample database and generate the associative sample image, to obtain the associative sample database;
a sample database storage module, configured to store the sample database,
wherein the associative feature comprises at least one of scene, glasses, accessory, clothing, hair style.

14. The device according to claim 12, wherein the weight analysis module is further configured to conduct matching of the image to be matched based on a feature sample database, wherein the algorithm processing module is further configured to:
change a local feature of the associative sample image in the associative sample database and generate a feature sample image, to obtain the feature sample database,
wherein the local feature includes at least one of nevus, scar, beard, eyebrow shape, mouth, nose, eye, and ear.

15. The device according to claim 12, wherein when the first matching result is smaller than the first threshold, the weight analysis module is further configured to: determining, by the weight analysis module, the third matching result comprises: setting a first weight value for the first matching result; setting a second weight value for the second matching result; determining a third matching result based on a product of the first matching result and the first weight value and a product of the second matching result and the second weight value, wherein the first weight value is greater than the second weight value.

16. The device according to claim 15, wherein when the third matching result is smaller than the second threshold, the weight analysis module is further configured to:
match the image to be matched with the feature sample image in the feature sample database, and determine a fourth matching result;
determine a fifth matching result based on the first matching result, the second matching result and the fourth matching result;
generate the final matching result based on the fifth matching result when the fifth matching result is greater than or equal to the third threshold,
wherein the third threshold is the same as or different from the second threshold,
determining, by the weight analysis module, by the fifth matching result comprises:
setting a third weight value for the first matching value;
setting a fourth weight value for the second matching value;
setting a fifth weight value for the fourth matching value;
determining the fifth matching result based on a product of the first matching result and the third weight value, a product of the second matching result and the fourth weight value, and a product of the fourth matching result and the fifth weight value,
wherein the third weight value is greater than the fourth weight value, and the fifth weight value.

17. The device according to claim 14, wherein the algorithm processing module is further configured to update at least one of the original sample database, the associative sample database, and the feature sample database based on the image to be matched.

* * * * *